(12) United States Patent
Talamine et al.

(10) Patent No.: US 9,786,920 B2
(45) Date of Patent: Oct. 10, 2017

(54) MULTI-THICKNESS CURRENT COLLECTOR

(71) Applicant: Greatbatch Ltd., Clarence, NY (US)

(72) Inventors: Kenneth B. Talamine, Amherst, NY (US); Lou Serpe, Clarence Center, NY (US); Gary L. Freitag, East Aurora, NY (US)

(73) Assignee: Greatbatch Ltd., Clarence, NY (US)

( * ) Notice: Subject to any disclaimer, the term of this patent is extended or adjusted under 35 U.S.C. 154(b) by 0 days.

(21) Appl. No.: 15/171,082

(22) Filed: Jun. 2, 2016

(65) Prior Publication Data

US 2016/0285105 A1    Sep. 29, 2016

Related U.S. Application Data

(63) Continuation of application No. 14/467,966, filed on Aug. 25, 2014, now Pat. No. 9,455,448.

(Continued)

(51) Int. Cl.
*H01M 4/72* (2006.01)
*H01M 10/0525* (2010.01)
(Continued)

(52) U.S. Cl.
CPC ............... *H01M 4/72* (2013.01); *H01M 2/26* (2013.01); *H01M 4/661* (2013.01); *H01M 4/662* (2013.01); *H01M 10/0525* (2013.01); *H01M 4/06* (2013.01); *H01M 4/13* (2013.01); *H01M 4/382* (2013.01); *H01M 4/405* (2013.01);
(Continued)

(58) Field of Classification Search
CPC ............ H01M 2/26; H01M 6/16; H01M 4/72; H01M 4/662; H01M 4/661; H01M 4/06; H01M 4/13; H01M 4/382; H01M 4/405; H01M 4/485; H01M 4/5815; H01M 4/587; H01M 10/0525; H01M 10/052
See application file for complete search history.

(56) References Cited

U.S. PATENT DOCUMENTS 6,110,622 A    8/2000  Frysz et al.
6,436,571 B1   8/2002  Passaniti et al.
(Continued)

FOREIGN PATENT DOCUMENTS

EP    0975038        1/2000
JP    358209863     12/1983
(Continued)

*Primary Examiner* — Patrick Ryan
*Assistant Examiner* — Aaron Greso
(74) *Attorney, Agent, or Firm* — Michael F. Scalise

(57) ABSTRACT

A current collector in the form of a conductive substrate subjected to a special chemical etch to provide the current collector having a multi-thickness structure, is described. The multiple-thickness current collector structure provides an electrochemical cell with increased charge capacity per volume while enabling a robust weld connection thereto. The current collector has a frame and comprises within an inner perimeter of the frame, first strand structures that intersect second strand structures to provide a plurality of openings or interstices bordered by the strands. At least one tab portion having a thicker distal portion spaced from a thinner proximal tab portion that extends from an outer perimeter of the frame.

20 Claims, 8 Drawing Sheets

Related U.S. Application Data

(60) Provisional application No. 61/869,226, filed on Aug. 23, 2013.

(51) Int. Cl.

| | | |
|---|---|---|
| *H01M 2/26* | (2006.01) | |
| *H01M 4/66* | (2006.01) | |
| *H01M 4/38* | (2006.01) | |
| *H01M 4/40* | (2006.01) | |
| *H01M 4/485* | (2010.01) | |
| *H01M 4/58* | (2010.01) | |
| *H01M 4/587* | (2010.01) | |
| *H01M 4/06* | (2006.01) | |
| *H01M 4/13* | (2010.01) | |
| *H01M 10/052* | (2010.01) | |
| *H01M 6/16* | (2006.01) | |

(52) U.S. Cl.
CPC ............ *H01M 4/485* (2013.01); *H01M 4/587* (2013.01); *H01M 4/5815* (2013.01); *H01M 6/16* (2013.01); *H01M 10/052* (2013.01)

(56) References Cited

U.S. PATENT DOCUMENTS

| | | | |
|---|---|---|---|
| 7,544,220 | B2 | 6/2009 | Zhao et al. |
| 8,741,487 | B1 | 6/2014 | Duggan et al. |
| 2002/0146625 | A1 | 10/2002 | Probst |
| 2004/0191621 | A1 | 9/2004 | Heller, Jr. |
| 2007/0111089 | A1* | 5/2007 | Swan .................... H01M 2/024 429/160 |
| 2011/0223470 | A1 | 9/2011 | Tomantschger |
| 2011/0240090 | A1 | 10/2011 | Johnson et al. |
| 2012/0148904 | A1* | 6/2012 | Swan .................... H01M 2/024 429/160 |
| 2012/0231307 | A1* | 9/2012 | Ha .......................... H01M 2/06 429/82 |
| 2012/0301789 | A1 | 11/2012 | Loveness et al. |

FOREIGN PATENT DOCUMENTS

| | | |
|---|---|---|
| WO | 2010022669 | 3/2010 |
| WO | 2013036801 | 3/2013 |

\* cited by examiner

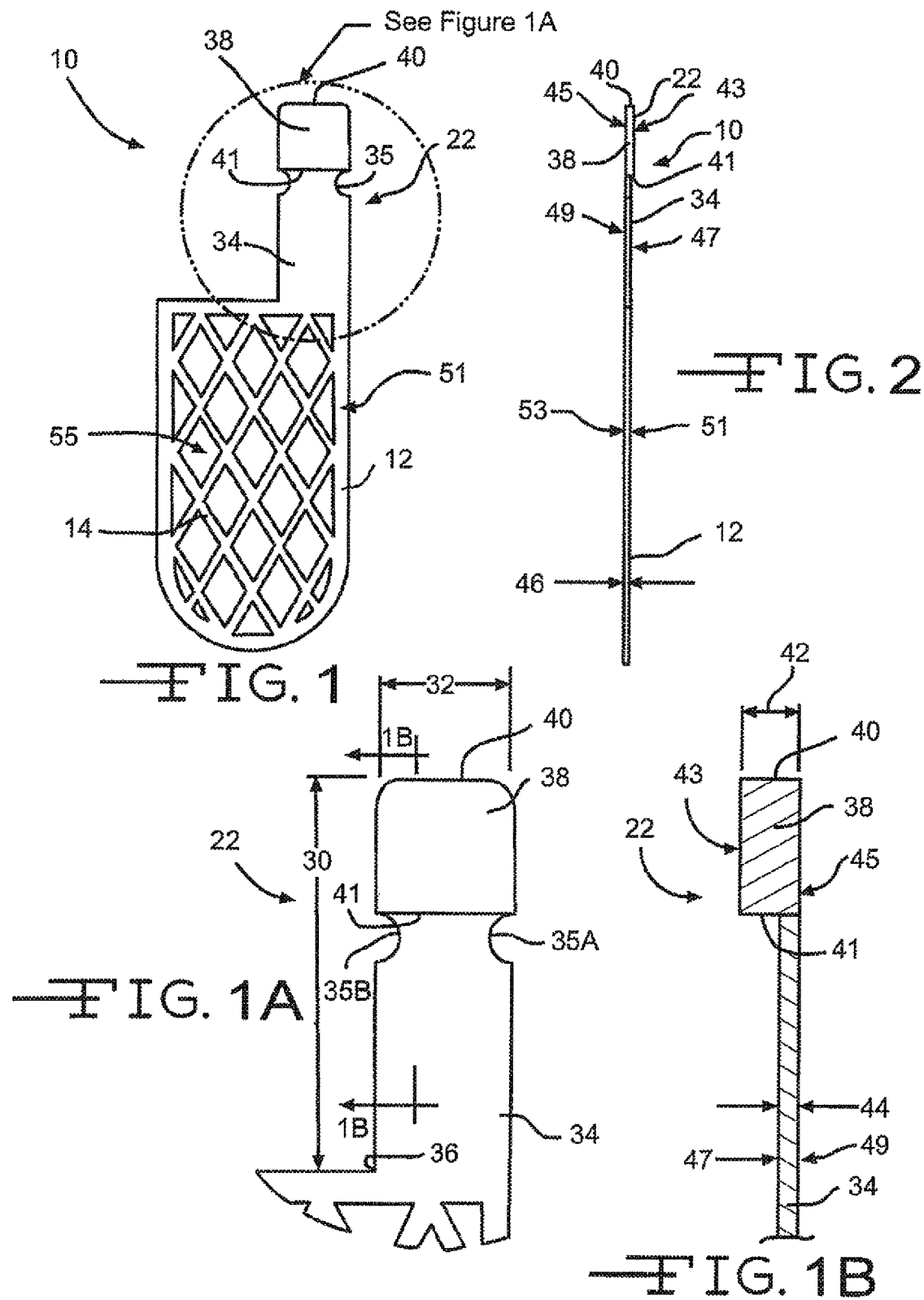

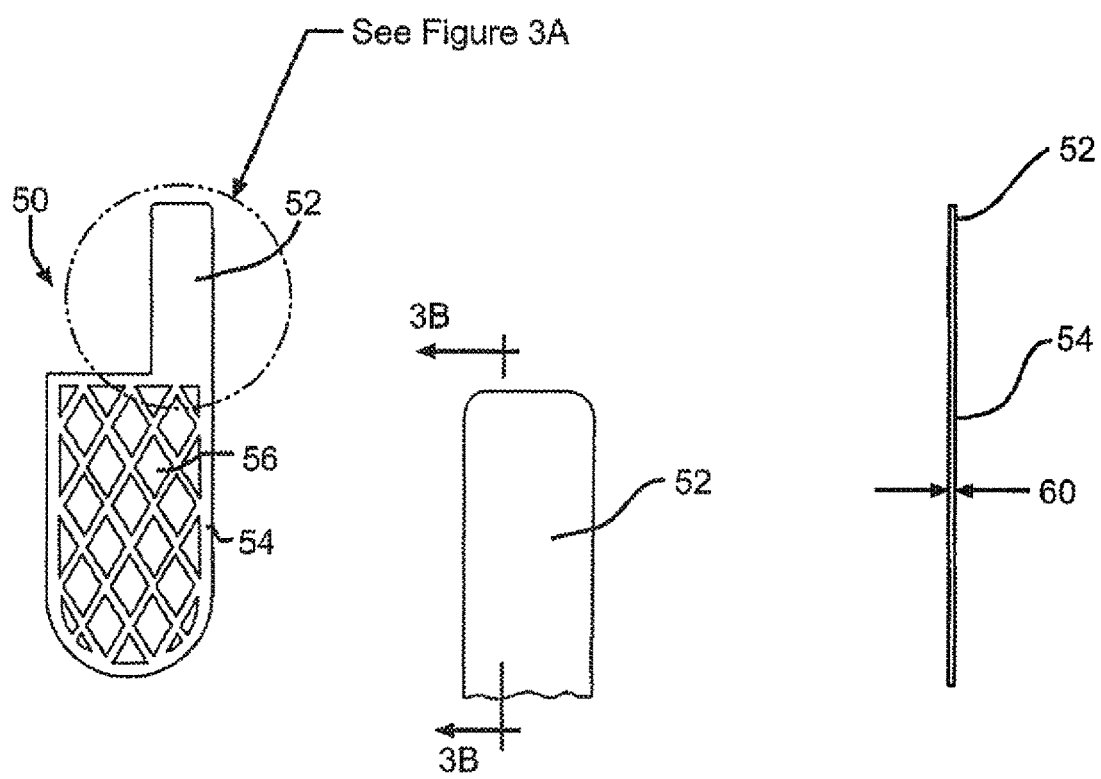
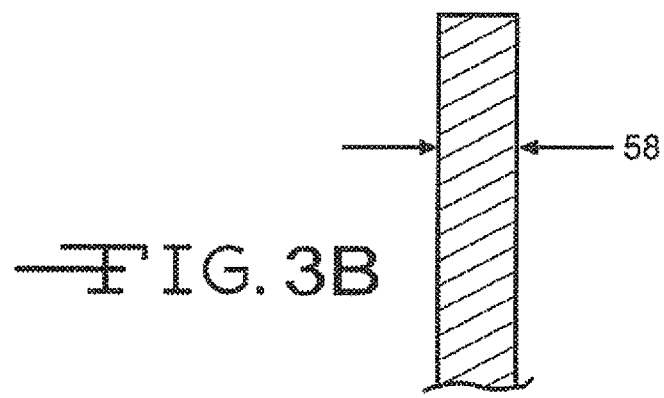

MULTI-THICKNESS CURRENT COLLECTOR

CROSS-REFERENCE TO RELATED APPLICATIONS

This application is a continuation of U.S. patent application Ser. No. 14/467,966, filed on Aug. 25, 2014, now U.S. Pat. No. 9,455,448, which claims priority from U.S. Provisional Patent Application Ser. No. 61/869,226, filed Aug. 23, 2013.

FIELD OF THE INVENTION

The present invention generally relates to the conversion of chemical energy to electrical energy. More particularly, the present invention relates to a conductive substrate that is used as a current collector in an electrochemical cell.

PRIOR ART

In general, it is desirable to maximize the amount of active cathode and anode material within a given volume of an electrochemical cell. Thus, increasing the amount of active electrode material provides for more material to react which, therefore, increases the capacity of an electrochemical cell.

However, inactive components such as the anode and cathode current collectors, which are necessary for electrical conduction of an electrode assembly, occupy a portion of the volume within the cell that could otherwise be occupied by additional active electrode materials. This is particularly the case for electrochemical cells having a relatively small volume. Given a particularly small sized cell, regaining even a fraction of a cubic inch of volume in active electrode material could be significantly beneficial in improving the useful life of a cell. Therefore, it is desired to construct an electrochemical cell such that the inactive components therewithin occupy a minimal amount of volume so that the amount of active electrode material can be maximized. Such a maximized amount of active electrode material provides for an electrochemical cell with increased electrical energy capacity per unit cell volume.

Prior art current collectors are typically constructed having a uniform thickness. These prior art designs are not optimal because some of the uniform thickness of the current collector unnecessarily occupies volume within the cell which could otherwise be occupied by active electrode material. However, if the current collector is constructed having a thickness that is too thin, there may not be a sufficient amount of collector material to provide a mechanically robust connection, such as via a weld connection, to a terminal lead within the cell. The terminal lead, which at least partially resides within the casing of a cell, provides an electrical connection between the current collector and an external electrical load powered by the cell. Thus, it is important that the mechanical connection between the current collector and the terminal lead is mechanically robust such that it can withstand various mechanical stresses without disconnecting over long periods of time.

The connection between the current collector and a terminal lead is typically formed by joining a tab portion that extends from a frame of the current collector to the lead by a weld connection, such as a laser or resistance weld connection. However, if the tab portion is too thin, it may be difficult to form a robust connection. For example, heat from the laser beam of the welding process may burn through the thickness of the tab portion. In addition, if the thickness of the tab portion is too thin, heat of the welding process may embrittle the metal and thus form a brittle joint that is not mechanically robust. Thus, it is important that the tab portion of the current collector be of a sufficient thickness to enable the formation of a robust mechanical connection to a terminal lead. Therefore, a current collector having a structure comprising an optimized thickness profile is desired to allow for an increased capacity as well as enabling a mechanically robust weld connection.

The present invention therefore, provides a current collector having a more optimized design that achieves a balance between increasing the volume of active electrode material without sacrificing the ability to provide a robust weld connection. The current collector of the present invention utilizes a reduced amount of material at selected locations to thereby allow for a greater volume of active electrode material while at the same time enabling the formation of a mechanically robust weld connection thereto.

More specifically, the present invention provides a current collector comprising an active electrode material contact area with a relatively thin thickness and a thicker tab portion that extends therefrom. The relatively thin active electrode material contact area of the current collector of the present invention allows for the incorporation of additional active electrode material within a given volume of an electrochemical cell. In addition, the increased thickness of the tab portion of the current collector provides more material with which to form a robust mechanical connection, specifically, a mechanical connection between the current collector and a terminal lead positioned within the cell.

SUMMARY OF THE INVENTION

The present invention is, therefore, directed to a conductive substrate that serves as a current collector having a structure that provides an improved mechanically robust connection between a terminal lead of an electrochemical cell and the current collector. At the same time, the present current collector allows for increased volumetric efficiency of active electrode material within a given electrochemical cell volume. This is achieved by constructing the current collector of the present invention with multiple thicknesses. Specifically, the current collector is constructed having an active electrode grid portion with a relatively thin thickness and an outwardly extending connection tab portion, having a greater thickness than that of the grid portion.

The grid portion of the current collector is designed to contact the active electrode material and provide an electrical connection thereto. In addition, the grid portion is constructed having a relatively thin thickness that allows for an increased volume of active electrode material to be positioned within the cell and thus, as a result, increase the volumetric efficiency and capacity of the cell. As defined herein, "capacity" is the amount of electrical charge that is delivered by a cell over a rated voltage. At least a portion of the tab portion that extends outwardly from the grid portion of the current collector is preferably constructed having a thickness that is more optimally designed for the formation of a weld connection. Thus, the structure of the current collector of the present invention is optimally designed to both increase the volumetric efficiency and charge of an electrochemical cell while at the same time providing a mechanically robust connection of the current collector to a terminal lead or other electrical connection within the cell case.

Specifically, the current collector is designed such that the distal portion of the tab has an increased thickness in comparison to the opposing proximal portion of the tab and the grid portion that contacts the active electrode material. Increasing the thickness of the distal portion of the tab provides substantially more material with which to form a contact weld. Furthermore, reducing the thickness of the active electrode material contact area and proximal tab portion provides more volume for additional active electrode material and activating electrolyte. In addition, the relatively thin proximal tab portion provides the current collector with increased flexibility and freedom of motion. The current collector therefore, enhances volumetric efficiency and capacity while at the same time provides for a flexible, robust mechanical connection within the cell.

When an electrochemical cell containing electrodes built with the present current collector is used to power an implantable medical device, such as a pacemaker or cardiac monitoring device, there results reduced charging times and increased discharge capacity, thereby extending the medical device life. In addition, the current collector of the present invention allows for support flexibility in selection of electrode material type by optimizing the passive current collector material volume.

The present current collector is preferably formed by chemically etching selected surfaces of a blank sheet of metal. Multiple applications of the chemical etchant may be applied to selected surfaces of the metal blank such that the desired thickness of the grid structure and tab portion is achieved. Alternatively, the structure of the current collector may also be formed by machining or laser trimming a sheet of metal to the desired shape and size.

These and other objects of the present invention will become increasingly more apparent to those skilled in the art by reference to the following description and to the appended drawings.

DETAILED DESCRIPTION OF THE DRAWINGS

FIG. 1 is a front view of an embodiment of the current collector of the present invention.

FIG. 1A is an enlarged view of a tab that extends outwardly from the body of the current collector shown in FIG. 1.

FIG. 1B is a cross-sectional view along line 1B-1B of FIG. 1A.

FIG. 2 is a side view of the current collector shown in FIG. 1.

FIG. 3 is a front view of an embodiment of a prior art current collector.

FIG. 3A is an enlarged view of a tab portion of the prior art current collector shown in FIG. 3.

FIG. 3B is a cross-sectional view along line 3B-3B of FIG. 3A.

FIG. 4 is a side view of the prior art current collector shown in FIG. 3.

DETAILED DESCRIPTION OF THE PREFERRED EMBODIMENTS

Figure 5A:
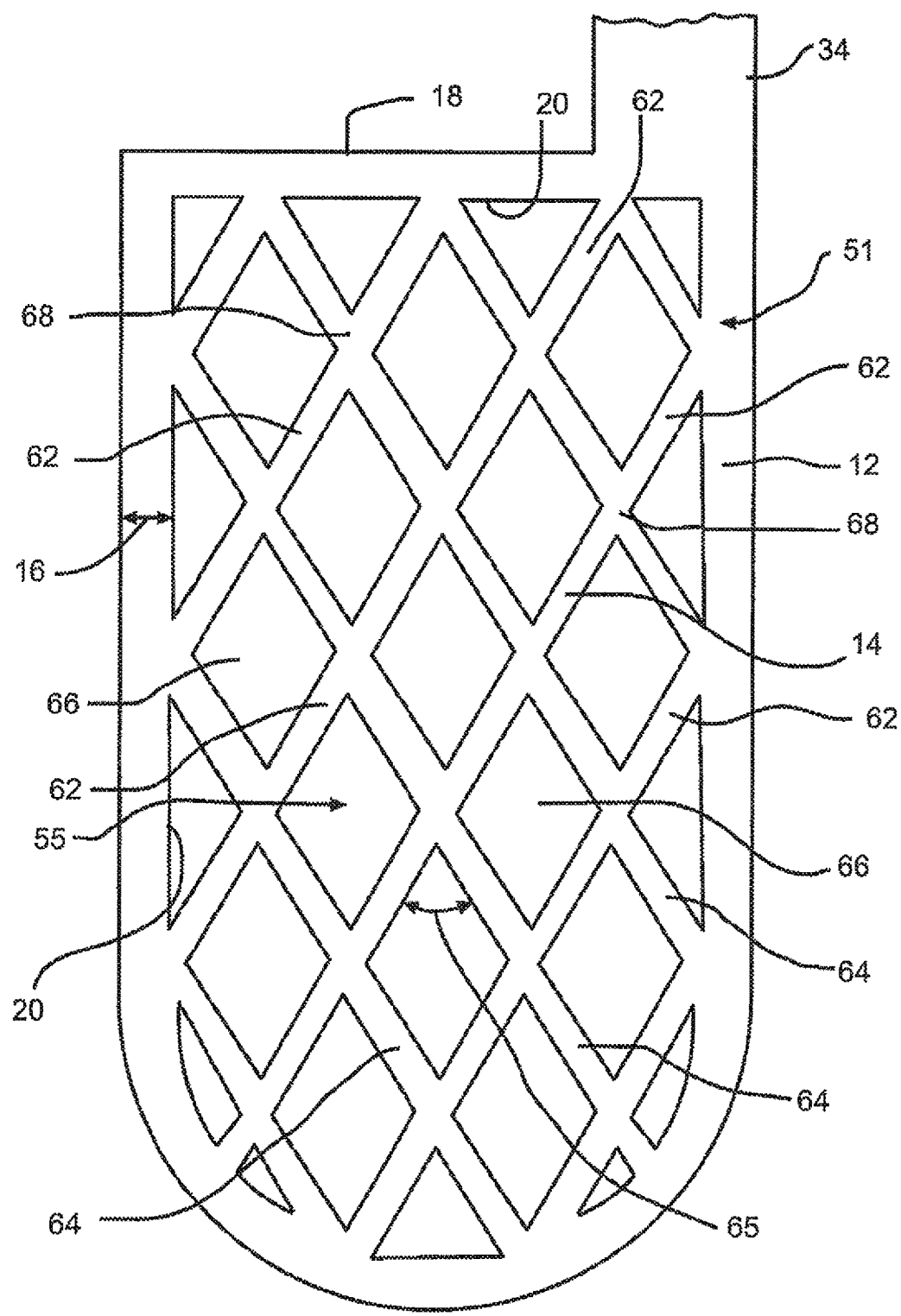
FIG. 5A is an enlarged view of an embodiment of a grid structure of the current collector of the present invention.

Turning now to the drawings, FIGS. 1, 1A, 1B, 2, 6 and 7 show an embodiment of a conductive substrate 10 according to the present invention. The conductive substrate 10 is particularly useful as a current collector in an electrochemical energy storage device, has a generally elongated, rectangular shape provided with a perimeter frame 12 and an integral interior reticulum or grid structure 14 bordered by the frame 12. As illustrated, in FIGS. 5A and 5B, the frame 12 comprises a frame width 16 that is defined by an exterior frame perimeter 18 spaced from an interior frame perimeter 20. At least one tab 22 extends from the frame 12, and in the preferred embodiment of the conductive substrate 10 is integral therewith. More specifically, the tab 22 extends outwardly from the exterior frame perimeter 18. If desired, the tab 22 can be a separate part that is subsequently welded, fused or otherwise secured to the conductive substrate 10 at the frame 12 thereof. The tab(s) 22 provide for connecting an electrode 24 (FIGS. 8 and 9) comprising an active electrode material 26, such as an active anode material and/or an active cathode material, and the conductive substrate 10 to a cell terminal 28 (FIG. 10) or other electrical connection such as a case lid or case wall therewithin. Depending on the construction or configuration of the cell in which the substrate will be incorporated, the conductive substrate 10 may have a shape other than the rectangular one shown.

FIG. 1A illustrates an enlarged view of an embodiment of the tab 22 of the current collector 10 of the present invention. As shown, tab 22 comprises a tab length 30 and a tab width 32 that extends about perpendicular from the tab length 30. The length 30 of the tab 22 extends from a proximal tab portion 34 having a proximal tab end 36 to a distal tab portion 38 having a distal tab end 40. In a preferred embodiment, the tab length 30 may range from about 0.5 cm to about 5 cm with the distal portion 38 of the tab 22 comprising from about 0.1 cm to about 4 cm of the total tab length 30. Alternatively, the distal tab portion 38 may be constructed such that it comprises from about 5% to about 95% of the total tab length 30. In a preferred embodiment, the width 32 of the tab 22 may range from about 0.01 mm to about 10 mm.

As illustrated, the proximal end 36 of the tab 22 extends outwardly from the exterior perimeter 18 of the frame 12 and the grid structure 14. The distal portion 38 of the tab 22 is designed to provide an electrical connection within the cell, such as by physically joining and electrically contacting a terminal lead 28 (FIG. 10) that is at least partially positioned within an electrochemical cell.

Figure 8:
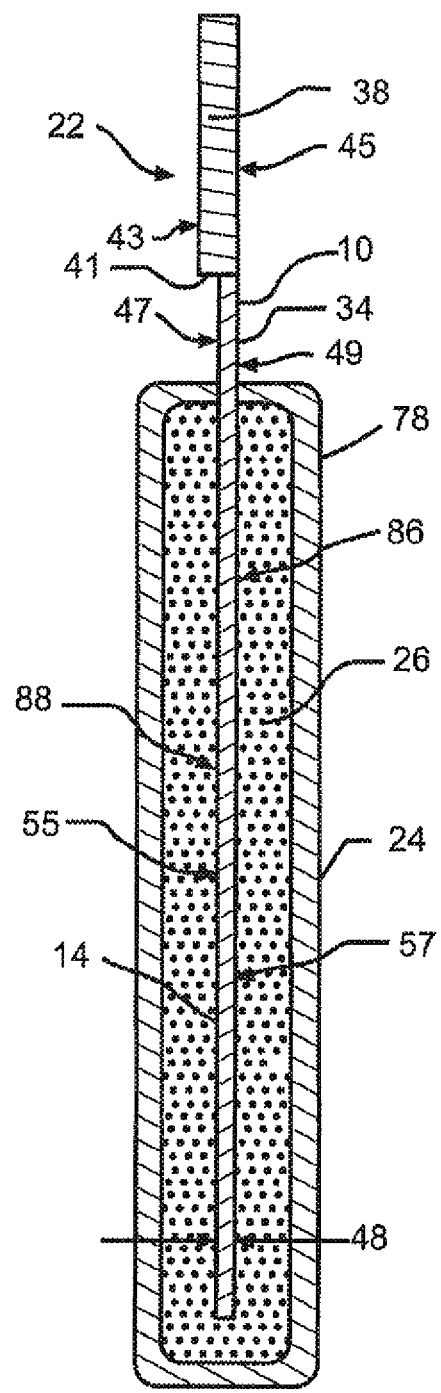
FIG. 8 illustrates a cross-sectional view of an embodiment of an electrode utilizing the current collector of the present invention.

In a preferred embodiment, the distal portion 38 of the tab 22 is constructed having a first thickness 42 (FIG. 1B) that is greater than a second thickness 44 of the proximal portion 34 of the tab 22. The first thickness 42 of the distal tab portion 38 extends perpendicular from the tab length 30 and is defined by opposing first and second major distal tab portion surfaces 43, 45 (FIG. 2). In that manner, a step 41 from the first thickness 42 to the second thickness 44 delineates the distal tab portion 38 from the proximal tab portion 34. The second thickness 44 of the proximal tab portion 34 also extends perpendicular from the tab length 30 and is defined by first and second major proximal tab portion surfaces 47, 49 (FIG. 1B). In addition, the first thickness 42 of the distal tab portion 38 is constructed such that it is greater than a third thickness 46 of the frame 12 (FIG. 2) and a fourth thickness 48 of the grid structure 14 (FIG. 8). The third thickness 46 of the frame is defined by opposed first and second major frame surfaces 51, 53 (FIG. 2) and the fourth thickness 48 of the grid structure is defined by first and second major grid surfaces 55, 57 (FIG. 8).

The thicker distal tab portion 38 provides for more material with which to attach the current collector 10 to a terminal lead 28 (FIG. 10) of an electrochemical cell. In addition, the relatively thinner proximal tab portion 34, frame 12 and grid structure 14 of the current collector 10 allows for the incorporation of an increased volume of active electrode material 26 within the cell as the thinner proximal tab portion 34, frame 12 and grid structure 14 occupy less space within the cell. As a result, an electrochemical cell (not shown) comprising the current collector 10 of the present invention has an increased volumetric efficiency and charge as compared to a similar cell constructed with the current collector of the prior art having a uniform thickness. For example, an electrochemical cell constructed with the current collector 10 of the present invention may exhibit an increase in volumetric efficiency and capacity, on a per unit cell volume basis, of between about 2 percent to about 10 percent as compared to a similar electrochemical cell constructed with a current collector of the prior art having a uniform thickness.

Figure 6:
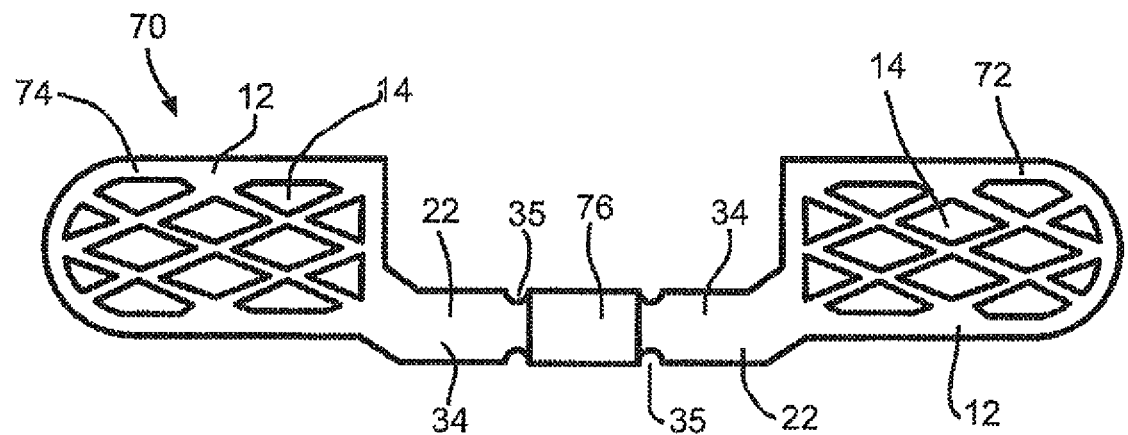
FIG. 6 is an embodiment of a current collector structure of the present invention.

In addition, as illustrated in FIGS. 1, 1A, and 6, the proximal portion 34 of the tab 22 may comprise a notch 35. As illustrated in FIG. 1A, the notch 35 is preferably oriented about perpendicular to the tab length 30 and extends within a portion of the second thickness 44 of the proximal portion 34 of the tab 22. More preferably, the notch 35 may reside at the junction between the distal tab portion 38 and the proximal tab portion 34. The notch 35 enables increased flexibility and improved hinging motion of the tab 22. As illustrated in FIG. 1A, the tab 22 may comprise left and right notches 35A, 35B which respectively extend opposite each other into the second thickness 44 of the proximal tab portion 34.

In comparison, the current collector 50 of the prior art, illustrated in FIGS. 3, 3A, 3B and 4, is generally constructed having a uniform thickness. As shown in the side view of FIG. 4, the tab portion 52, frame 54 and grid portion 56 of the prior art current collector 50 is constructed of a uniform thickness. As illustrated in FIGS. 3B and 4, the tab thickness 58 extending along the full length of tab 52 is the same as the thickness 60 of the grid portion 56. Thus, when constructing electrochemical cells utilizing the current collector 50 of the prior art, a trade-off between an increased volumetric efficiency and charge and a robust weld connection is often made. For example, since the current collector 50 of the prior art is constructed having a uniform thickness, it can either be constructed having a relatively thin thickness, which allows for an increased volume of active electrode material and thus an increase in volumetric efficiency and charge, but compromises weld strength and durability. Alternatively, the current collector 50 of the prior art can be constructed having a greater thickness which thus increases the strength and durability of the weld connection, but sacrifices active electrode volume and capacity. In comparison, the multi-thickness design of the current collector 10 of the present invention enables an increased electrode volume while enabling a more robust current collector connection.

Figure 5B:
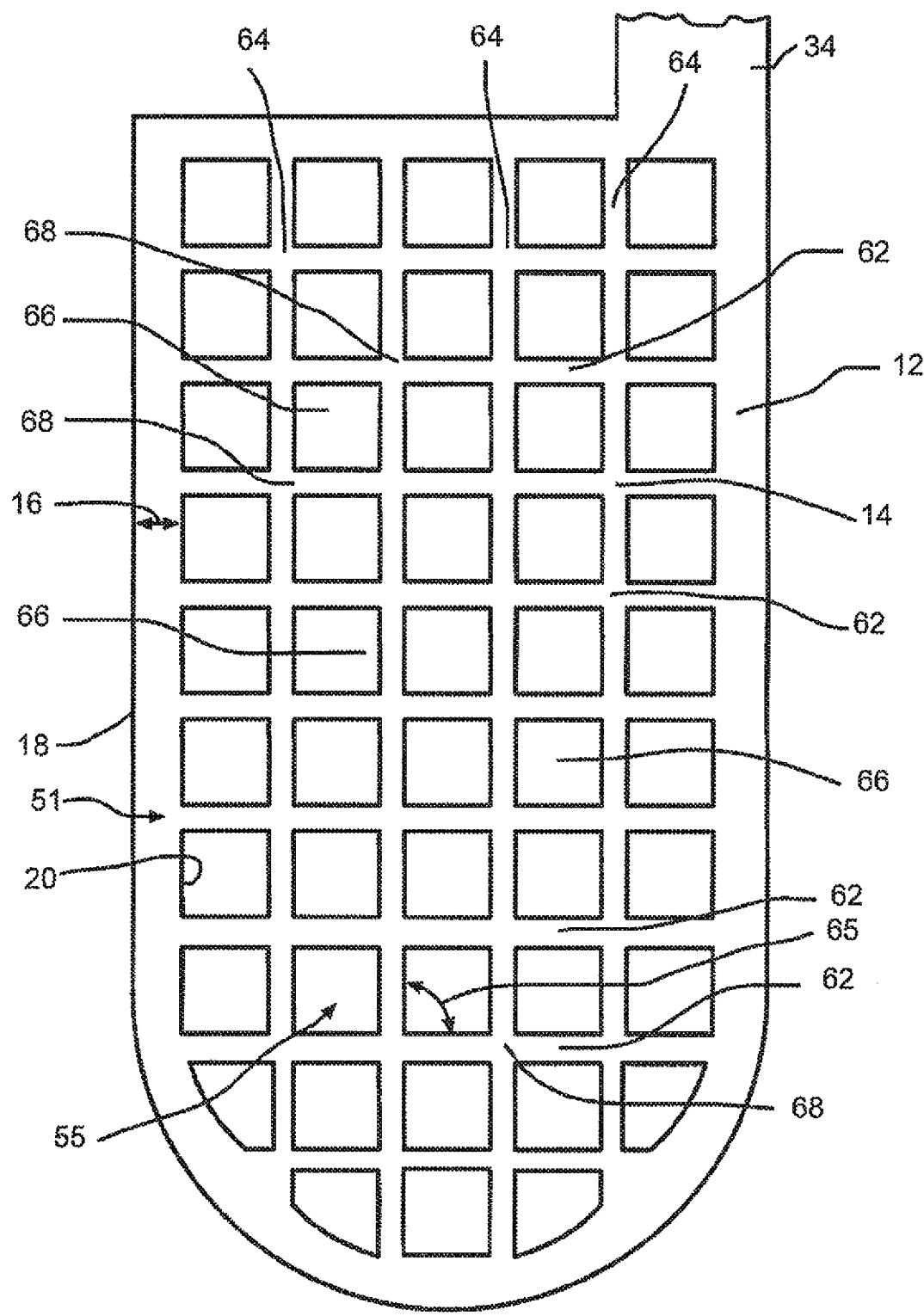
FIG. 5B is an enlarged view of an alternate embodiment of a grid structure of the current collector of the present invention.

As illustrated in FIGS. 1, 5A and 5B, the grid structure 14 of the present current collector 10 preferably comprises a lattice construction surrounded by the interior perimeter 20 of the frame 12. In an embodiment, the grid structure 14 comprises first strand structures 62 that intersect second strand structures 64 to provide a plurality of openings or interstices 66 bordered by the strands (FIGS. 5A and 5B). The strand structures 62, 64 intersect or join with each other at junctions 68 thereby forming the grid structure 14 as an integral unit. The openings 66 of the grid structure 14 may be of a plurality of non-limiting shapes such as a diamond-shape as illustrated in FIGS. 1 and 5A or a rectangular-shape as illustrated in FIG. 5B. In addition, the interstice 66 may comprise an opening of a shape selected from a circle, a triangle, an octagon, a hexagon or other polygon shape. It is further contemplated that the grid structure 14, itself may be configured of a shape selected from a circle, a triangle, an octagon, a hexagon or other polygon shape. The open area provided by the interstices 66 may range from about 2 percent to about 90 percent of the total area surrounded by the interior perimeter 20 of the frame 12. Or the conductive substrate 10 could be devoid of a grid structure. In other words, there would not be any interstices. It is further contemplated that the lattice structure of the interior grid 14 may be configured in a plurality of non-limiting arrangements, examples of which are illustrated in U.S. Pat. No. 8,741,487 to Duggan et al., which is assigned to the assignee of the present invention and incorporated herein by reference.

In a preferred embodiment, as illustrated in FIGS. 1B and 2, the first thickness 42 of the distal portion 38 of the tab 22 may range from about 0.01 mm to about 2.0 mm. The second thickness 44 of the proximal portion 34 may range from 0.01 mm to about 1.5 mm. Alternatively, the second thickness 44 of the proximal tab portion 34 may be constructed such that it is about 25 to about 75 percent of the first thickness 42 of the proximal tab portion 34.

Furthermore, the third thickness 46 (FIG. 2) of the frame 12 may range from about 0.01 mm to about 1.5 mm. Likewise, the fourth thickness 48 (FIG. 8) of the grid structure 14 may be about 0.01 mm to about 1.5 mm. In an embodiment, the third thickness 46 of the frame 12 and the fourth thickness 48 of the grid structure 14 may be constructed having about the same thickness as the second thickness 44 of the proximal tab portion 34. In an alternate embodiment, the first thickness 42 of the distal tab portion 38, the second thickness 44 of the proximal tab portion 34, the third thickness 46 of the frame 12 and the fourth thickness 48 of the grid structure 14 may have different thicknesses. For example, the first thickness 42 of the distal tab portion 38 may be constructed to be greater than the second thickness 44 of the proximal tab portion 34. The second thickness 44 of the proximal tab portion 34 may be greater than the third thickness 46 of the frame 12 and the third thickness 46 of the frame 12 may be constructed to be greater than the fourth thickness 48 of the grid structure 14. In this particular embodiment, the thinner grid structure 14 of the current collector 10 allows for an even greater volume of the active electrode material 26 to be positioned within the cell.

Figure 7:
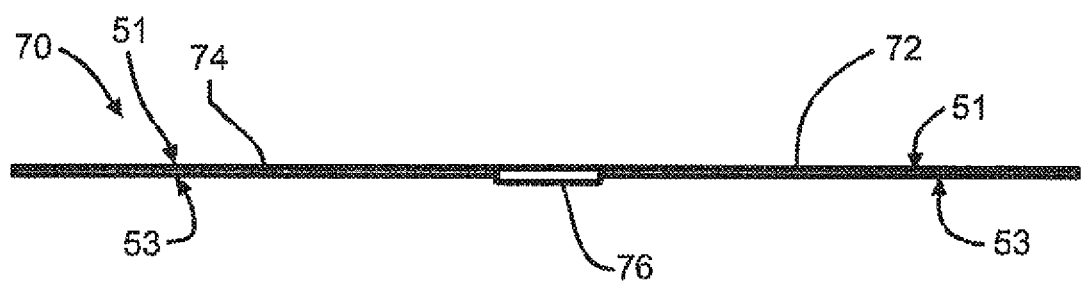
FIG. 7 is a side view of the current collector structure embodied in FIG. 6.
Figure 9:
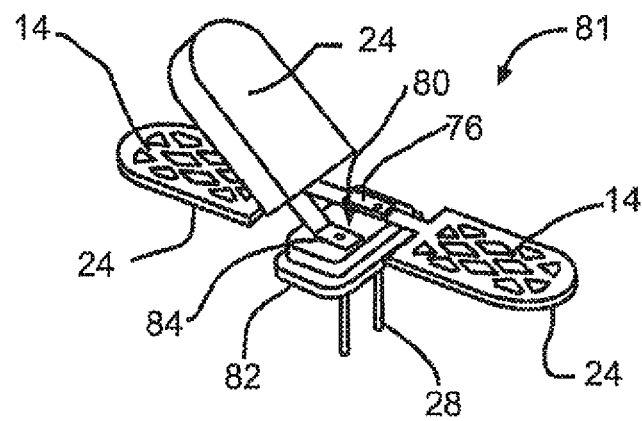
FIG. 9 is a perspective view of an embodiment of an electrode assembly utilizing the current collector of the present invention.

FIGS. 6 and 7 illustrate an embodiment of a current collector structure 70 in which a first current collector 72 and a second current collector 74 of the present invention are joined together. As illustrated, the current collector structure 70 comprises a tab junction 76 in which the respective tabs 22 of the first and second current collectors 72, 74 are joined together. Specifically, the current collector structure 70 is constructed such that the distal ends 40 of the respective distal portions 38 of the first and second current collectors 72, 74 are joined together. As illustrated, the first and second current collectors 72, 74 of the structure 70 are joined such that they are mirror images of each other. The increased thickness of the respective distal tab portions 38 of the current collectors 72, 74 provides the junction 76 with an increased thickness that enables the construction of an electrode assembly 81 with a robust weld connection as shown in FIG. 9. In this embodiment, the tab junction 76 forms an anchor from which the opposing first and second current collectors 72, 74 hinge therefrom. This hinge design allows for the two halves of the current collector structure 70 to bend independently. In addition, the increased flexibility afforded by the distal tab junction 76 allows for construction of smaller cell sizes as the current collector is contorted and confined in a reduced volume. The thicker distal tab portions 38 of the respective opposed first and second current collectors 72, 74 also increases the weld connection durability and robustness.

FIG. 8 illustrates an embodiment of the current collector 10 of the present invention incorporated into an electrode 24. As shown, active electrode material 26 comprising either an active anode material and/or an active cathode material is contacted to the first major surface 55 and/or the second major surface 57 of the grid structure 14 of the current collector 10. As shown in this embodiment, a separator material 78 may be wrapped around the active electrode material 26 sealing it therewithin. As shown, the distal tab portion 38 extends outwardly from the electrode 24.

FIG. 9 illustrates an embodiment of an electrode assembly 81 comprising the current collector structure 70 of the present invention. As shown, the distal tab junction 76 is shown welded to an inner surface 80 of a casing lid 82. The distal tab junction 76 allows for a durable and robust weld connection 84 of the current collector structure 70 to the inner surface 80 of the casing lid 82. Alternatively, the distal tab portion 38 of a single current collector 10 may be welded to the inside surface 80 of a case lid 82. The increased robustness of the weld connection 84 between the current collector structure 70 and the casing lid 82 allows for increased movement and durability of the opposed first and second current collectors 72, 74. Thus, an additional amount of active electrode material 26 may be positioned within a casing (not shown) of the cell.

Figure 10:
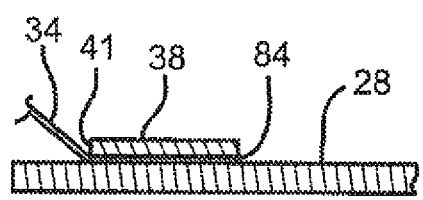
FIG. 10 is an enlarged partially broken cross-sectional view of the distal tab portion welded to a terminal lead.

FIG. 10 shows a cross-sectional view of an embodiment of a weld connection 84 between the current collector 10 of the present invention and a terminal lead 28 of an electrochemical cell. As shown, the distal tab portion 38 of the current collector 10 is shown welded to a terminal lead 28.

According to the present invention, the current collector 10 of the present invention is fabricated by the controlled dissolution or corrosion of a sheet-like or foil shaped workpiece through contact with an etchant in a chemical machining or photochemical machining process. In that respect, the conductive substrate 10 begins as conductive coil stock (not shown) having generally planar opposed major surfaces in an uncoiled, laid flat orientation. The coil stock preferably has a thickness of about 0.001 to about 2 mm and is cut into sheets from which a multiplicity of current collectors 10 or current collector structure 70 will subsequently be fabricated in a batch operation. The cut sheets are subjected to a precleaning process such as a chromic acid bath to remove scale and then run through a pumice slurry that serves to render the workpiece sheets having a clean condition, ready for processing after being rinsed and dried.

A dry film resist or mask is then applied to selected portions of surface(s) of the workpiece to thereby protect the coated surfaces from the chemical action of the subsequent chemical machining or photochemical machining process. As is well known by those skilled in the art, the protective resist is inert to the etchant compounds, is able to withstand the heat from etching, adheres well to the workpiece and is easily and inexpensively removed after etching. The resist must also be tough enough to withstand handling; rigid enough to prevent drooping when undercut, yet scribe easily or spray cleanly. Numerous synthetic or rubber-base resist materials are available in a wide variety of types and trade names.

To fabricate the conductive substrate 10 or current collector structure 70, the resist is first applied to the first major surface 43 of the distal tab portion 38 of the workpiece. A second coating of the resist material may also be adhered to the second major surface 45 of the distal tab portion 38 of the workpiece. Preferably, the resist is applied to the workpiece as a photoresist by a photographic technique. Such a process begins with a photo-sensitive resist applied to either or both major surfaces 43, 45 of the distal tab portion 38 followed by air drying or oven baking the resist contacted workpiece.

Next, contact printing from a workpiece negative of the to be produced distal tab portion 38 is followed by photographic development and drying. The workpiece is next moved through an etchant bath or otherwise contacted by the etchant solution such as by spraying. In the case of a titanium workpiece, for example, the etchant comprises a hydrogen fluoride/nitric acid solution. Those skilled in the art will readily recognize etchant solutions that are useful with other conductive substrate materials according to the present invention such as molybdenum, tantalum, niobium, cobalt, nickel, stainless steel, tungsten, platinum, palladium, gold, silver, copper, chromium, vanadium, aluminum, zirconium, hafnium, zinc and iron, and the like, and mixtures and alloys thereof.

The workpiece with the applied resist pattern having the shape of the distal tab portion 38 is contacted with the etchant for a period of time sufficient to etch away from each major surface a thickness of the workpiece material such that the remaining thickness of the to be formed proximal tab portion 34, frame 12 and grid structure 14 of the current collector 10 or current collector structure 70 is less than that of the first thickness 42 of the distal tab portion 38. Those areas not provided with resist on either major surface will be removed by the etchant chemical or solution of chemicals. In a preferred embodiment, the amount of material that is removed in this first etching step establishes the second thickness 44 of the proximal tab portion 34, the third thickness 46 of the frame 12 and the fourth thickness 48 of the grid structure 14.

After the thicknesses of the proximal tab portion 34, the frame 12 and the grid structure 14 have been established by the first etching process, a second application of resist is applied to the first major surfaces of the configuration of the proximal tab portion 34, the frame 12 and the strand structures 62, 64. The resist may also be applied to the second major surfaces of the proximal tab portion 34, the frame 12 and the strand structures 62, 64 if desired.

As before, the resist is applied to the workpiece as a photoresist by a photographic technique. Such a process begins with a photo-sensitive resist applied to the entire area of each major surface of the workpiece followed by air drying or oven baking the resist contacted workpiece. Next, contact printing from a workpiece negative of the to-be-produced frame 12 and grid structure 14 is followed by photographic development and drying. The workpiece is next moved through an etchant bath or otherwise contacted by the etchant solution such as by spraying.

The workpiece with the applied resist pattern having the shape of the frame 12 surrounding the grid structure 14 is contacted with the etchant for a period of time sufficient to etch away from each major surface a thickness of the workpiece material. That way, those areas not provided with resist on either major surface of the workpiece will be completely removed to provide the grid structure openings or interstices 66.

After the workpiece has been chemical machined to the desired extent to provide the desired grid structure 14 (FIGS. 1, 5 and 5A) having the openings 66 bordered by the frame 12 and the first and second strand structures 62, 64, the resist material is removed in an aqueous stripping solution. After rinsing and inspection, the individual conductive substrates 10 or current collector structures 70 are cut or otherwise removed from the workpiece sheet and are ready for incorporation into an electrochemical energy storage device. In particular, the thusly formed conductive substrates can be used to fabricate either the anode or the cathode of a primary or secondary electrochemical cell or battery.

Figure 11:
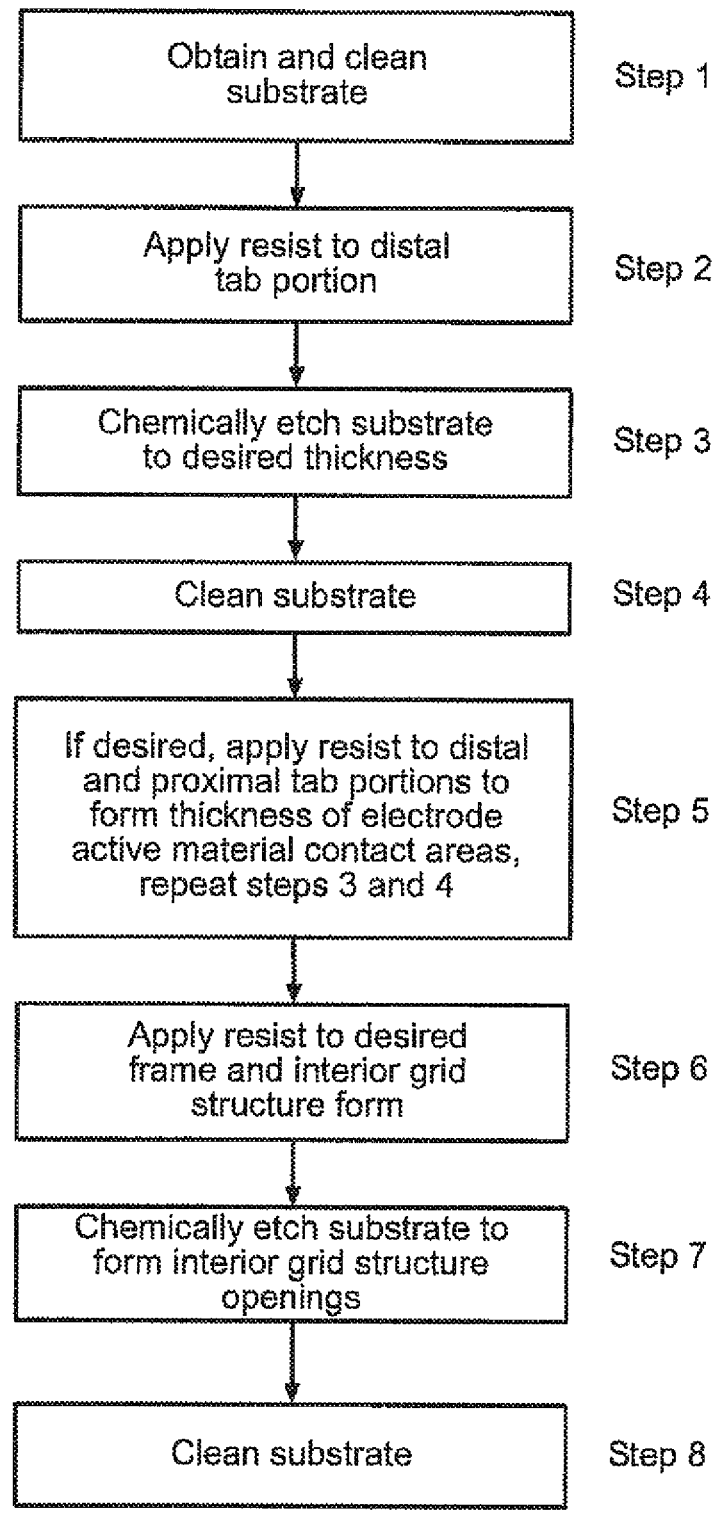
FIG. 11 is a flow chart that illustrates an embodiment of a process of creating the current collector of the present invention.

FIG. 11 is a flow chart that illustrates an embodiment of the steps of a chemical machining process that may be utilized to fabricate the current collector 10. As shown in the flow chart, a substrate is first obtained and cleaned. Secondly, a coating of resist material is applied to the distal tab portion 38. The substrate is then chemically etched to form the proximal tab portion 34 and the active electrode material contact areas comprising the frame 12 and grid structure 14, to a desired thickness. Alternatively, if desired, a coating of resist material may be applied to both the distal and proximal tab portions 38, 34. The substrate is then subsequently chemically etched to form the active electrode material contact area to a desired thickness that is less than the distal and proximal tab portions 38, 34. Lastly, an additional coating of resist material is applied to the substrate to form the grid structure 14 to a desired configuration. The substrate is then subjected to a chemical etchant or solution of etchants to form the grid structure openings 66. Additional examples of preferred chemical etchant processing methods are provided in U.S. Pat. No. 6,110,622 to Frysz et al., which is assigned to the assignee of the present invention and incorporated herein by reference.

As shown in FIGS. 1, 5A, 5B, and 6, in its finished form the conductive substrate 10 has substantially parallel first strand structures 62 intersecting second strand structures 64. In a preferred embodiment, the first and second strand structures may be oriented from each other at an angle indicated at 65 of about 90 degrees to about 15 degrees (FIGS. 5A, 5B). Each of the strands 62, 64 provide the first major surface of the conductive substrate 10 having a relatively smooth outer surface extending longitudinally along the strand 62, 64 length and joined to the frame 12 where the resist was located. Alternatively, the first major surface of the conductive substrate 10 may have a relatively rough outer surface.

As is readily apparent from the previous description, the strands 62, 64 of substrate 10 are substantially co-planar with the respective first and second major surfaces of the frame 12. If desired, the outer surfaces of the strands 62, 64 can be recessed somewhat from the first and second major frame surfaces 51, 53, thereby providing the fourth thickness 48 of the grid structure 14 being less than the third thickness 46 of the frame 12. Also, while the grid structures 14 in FIGS. 5A and 5B are shown having the respective strand structures aligned parallel to each other, that is not necessary. Those skilled in the art will understand that the strands 62, 64 need not be parallel but can have a variety of shapes including wavy, sinusoidal, concentric, and zig-zag among a myriad of others. It is further contemplated that the first and second strand structures 62, 64 may be configured in a "basket weave" structure in which the first or second strands 62, 64 are respectively positioned over each other. Examples of this "basket weave" grid structure 14 are provided in U.S. Pat. No. 6,110,622 to Frysz et al.

Examples of electrode active materials 26 that may be contacted to the conductive substrate 10 to provide an electrode (FIGS. 8 and 9) according to the present invention include metals, metal oxides, metal sulfides and mixed metal oxides. While not necessary, the electrode active material is preferably coupled with an alkali metal anode. Such electrode active materials include silver vanadium oxide, copper silver vanadium oxide, manganese dioxide, titanium disulfide, copper oxide, copper sulfide, iron sulfide, iron disulfide, cobalt oxide, nickel oxide, copper vanadium oxide, and other materials typically used in alkali metal electrochemical cells. Carbonaceous materials such as graphite, carbon and fluorinated carbon, which are useful in both liquid depolarizer and solid cathode primary cells and in rechargeable, secondary cells, are also useful with the present conductive substrate.

Thus, the present invention further comprises taking about 80 to about 99 weight percent of an already prepared electrode active material in a finely divided form and providing a slurry comprising the material. Prior to contact with the grid structure 14 of the conductive substrate 10 of the present invention, however, the finely divided electrode material is preferably mixed with up to about 10 weight percent of a binder material, preferably a thermoplastic polymeric binder material. The thermoplastic polymeric binder material is used in its broad sense and any polymeric material, preferably in a powdered form, which is inert in the cell and which passes through a thermoplastic state, whether or not it finally sets or cures, is included within the term "thermoplastic polymer". Representative materials include polyethylene, polypropylene and fluoropolymers such as fluorinated ethylene and propylene, polyvinylidene fluoride (PVDF) and polytetrafluoroethylene (PTFE), the latter material being most preferred. Natural rubbers are also useful as the binder material with the present invention.

In the case of a primary, solid cathode electrochemical cell, the cathode active material contacted to the "basket weave" conductive substrate is further combined with up to about 5 weight percent of a discharge promoter diluent such as acetylene black, carbon black and/or graphite. A preferred carbonaceous diluent is Ketjenblack® carbon. Metallic powders such as nickel, aluminum, titanium and stainless steel in powder form are also useful as conductive diluents.

Similarly, if the active material is a carbonaceous material serving as the cathode current collector in a primary, liquid depolarizer cell or a carbonaceous counter electrode in a secondary cell, the electrode material preferably includes a conductive diluent and a binder material in a similar manner as the previously described primary, solid cathode electrochemical cell.

To form the electrode active slurry, about 94 weight percent of the cathode material, regardless of whether it is a carbonaceous material or one or more of a mixture of the other previously described cathode active materials, is combined in a twin screw mixer with a dispersion of about 0 to 3 weight percent of a conductive diluent, about 1 to 5 weight percent of a powder fluoro-resin binder and a high permittivity solvent such as a cyclic amide, a cyclic carbonate or a cyclic ester.

After mixing sufficiently to ensure that the conductive diluent and the binder material are completely dispersed throughout the admixture and to otherwise completely homogenize the various constituents, the electrode admixture is removed from the mixer as a slurry containing about 14% solids, by volume. The step of subjecting the electrode admixture to the mixer to form the slurry can also include the addition of a liquid electrolyte. The electrode admixture slurry has a dough-like consistency and is preferably contacted onto the opposed sides of the grid structure 14 of the conductive substrate 10 of the present invention.

The thusly formed cathode laminate is heated to a temperature of between about 80° C. to about 130° C. and more preferably to about 110° C., for a period of about 30 minutes to about 60 minutes. The heating step is preferably carried out under vacuum and serves to remove any residual solvent from the cathode material. Heating, which further serves to plasticize the binder material, helps to ensure the structural integrity of the newly manufactured electrode laminate. The electrode laminate can then be stored for later use, or is immediately useable in an electrochemical cell. After drying to remove all residual water from the slurry contacted to the conductive substrate, the resulting anhydrous active admixture is calendared under a pressure of about 40 tons/inch$^2$ to laminate the active admixture to the grid structure 14 of the conductive substrate 10 of the present invention.

An alternate preferred method for providing an electrode is to form the blended electrode active admixture into a free-standing sheet prior to being contacted to the grid structure 14 of the conductive substrate 10. One preferred method of preparing a cathode material into a free-standing sheet is thoroughly described in U.S. Pat. No. 5,435,874 to Takeuchi et al., which is assigned to the assignee of the present invention and incorporated herein by reference. Other techniques for contacting the active material to the conductive substrate includes rolling, spreading or pressing the admixture thereto.

Cathodes prepared as described above are flexible and may be in the form of one or more plates operatively associated with at least one or more plates of anode material, or in the form of a strip wound with a corresponding strip of anode material in a structure similar to a "jellyroll".

The anode is of a metal selected from Group IA, IIA or IIIB of the Periodic Table of the Elements, including lithium, sodium, potassium, etc., and their alloys and intermetallic compounds including, for example, Li—Si, Li—Al, Li—B and Li—Si—B alloys and intermetallic compounds. The preferred anode comprises lithium, and the more preferred anode comprises a lithium alloy such as a lithium-aluminum alloy. However, the greater the amount of aluminum present by weight in the alloy the lower the energy density of the cell.

The form of the anode may vary, but preferably the anode is a thin metal sheet or foil of the anode metal, pressed or rolled on a metallic anode current collector, i.e., preferably comprising nickel, to form an anode component. Preferably, the anode current collector is of the present construction. In the exemplary cell of the present invention, the anode component has an extended tab or lead of the same material as the anode current collector, i.e., preferably nickel, integrally formed therewith such as by welding and contacted by a weld to a cell case of conductive metal in a case-negative electrical configuration. Alternatively, the anode may be formed in some other geometry, such as a bobbin shape, cylinder or pellet to allow an alternate low surface cell design.

An electrochemical cell having an alkali metal-containing electrode serving as an alkali metal anode, or an alkalated cathode body and a carbonaceous counter electrode according to the present invention further includes a separator provided therebetween. The separator is of electrically insulative material, and the separator material also is chemically unreactive with the anode and cathode active materials and both chemically unreactive with and insoluble in the electrolyte. In addition, the separator material has a degree of porosity sufficient to allow flow therethrough of the electrolyte during the electrochemical reaction of the cell. Illustrative separator materials include fabrics woven from fluoropolymeric fibers including polyvinylidene fluoride, polyethylenetetrafluoroethylene, and polyethylenechlorotrifluoroethylene used either alone or laminated with a fluoropolymeric microporous film. Other suitable separator materials include non-woven glass, polypropylene, polyethylene, glass fiber materials, ceramics, a polytetrafluoroethylene membrane commercially available under the designation ZITEX (Chemplast Inc.), a polypropylene membrane commercially available under the designation CELGARD (Celanese Plastic Company, Inc.) and a membrane commercially available under the designation DEXIGLAS (C. H. Dexter, Div., Dexter Corp.).

The electrochemical cell of the present invention further includes a nonaqueous, ionically conductive electrolyte which serves as a medium for migration of ions between the anode and the cathode electrodes during the electrochemical reactions of the cell. The electrochemical reaction at the electrodes involves conversion of ions in atomic or molecular forms which migrate from the anode to the cathode. Thus, nonaqueous electrolytes suitable for the present invention are substantially inert to the anode and cathode materials, and they exhibit those physical properties necessary for ionic transport, namely, low viscosity, low surface tension and wettability.

Suitable nonaqueous electrolyte solutions that are useful in both primary and secondary cells having an alkali metal electrode and a counter electrode of a solid material contacted to the grid structure 14 of the conductive substrate 10 preferably comprise a combination of a lithium salt and an organic solvent system. More preferably, the electrolyte includes an ionizable alkali metal salt dissolved in an aprotic organic solvent or a mixture of solvents comprising a low viscosity solvent and a high permittivity solvent. The inorganic, ionically conductive salt serves as the vehicle for migration of the alkali metal ions to intercalate into the carbonaceous material. Preferably the ion-forming alkali metal salt is similar to the alkali metal comprising the anode. Suitable salts include $LiPF_6$, $LiBF_4$, $LiAsF_6$, $LiSbF_6$, $LiClO_4$, $LiAlCl_4$, $LiGaCl_4$, $LiC(SO_2CF_3)_3$, $LiO_2$, $LiN(SO_2CF_3)_2$, LISCN, $LiO_3SCF_2CF_3$, $LiC_6F_5SO_3$, $LiO_2CCF_3$, $LiSO_3F$, $LiB(C_6H_5)_4$ and $LiCF_3SO_3$, mixtures thereof. Suitable salt concentrations typically range between about 0.8 to 1.5 molar.

In a liquid depolarizer/catholyte cell, suitable active materials such as sulfur dioxide or oxyhalides including phosphoryl chloride, thionyl chloride and sulfuryl chloride are used individually or in combination with each other or in combination with halogens and interhalogens, such as bromine trifluoride, or other electrochemical promoters or stabilizers.

In other electrochemical systems having a solid cathode or in secondary cells, the nonaqueous solvent system comprises low viscosity solvents including tetrahydrofuran (THF), methyl acetate (MA), diglyme, trigylme, tetragylme, dimethyl carbonate (DMC), ethyl methyl carbonate (EMC), 1,2-dimethoxyethane (DME), diisopropylether, 1,2-diethoxyethane, 1-ethoxy, 2-methoxyethane, dipropyl carbonate, ethyl methyl carbonate, methyl propyl carbonate, ethyl propyl carbonate and diethyl carbonate, and mixtures thereof, and high permittivity solvents include cyclic carbonates, cylic esters and cyclic amides such as propylene carbonate (PC), ethylene carbonate (EC), butylene carbonate, acetonitrile, dimethyl sulfoxide, dimethyl formamide, dimethyl acetamide, γ-butyrolactone (GBL), γ-valerolactone and N-methyl-pyrrolidinone (NMP), and mixtures thereof. In the present invention, the preferred alkali metal is lithium metal. For a solid cathode, primary cell and a secondary cell, the preferred electrolyte is $LiAsF_6$ or $LiPF_6$ in a 50:50, by volume, mixture of PC/DME. For a liquid depolarizer cell, the preferred electrolyte is 1.0M to 1.4M $LiBF_4$ in T-butyrolactone (GBL).

The preferred form of a primary alkali metal/solid cathode electrochemical cell is a case-negative design wherein the anode is in contact with a conductive metal casing and the cathode contacted to the grid structure 14 of the conductive substrate 10 serving as the current collector according to the present invention is the positive terminal. In a secondary electrochemical cell having a case-negative configuration, the anode (counter electrode)/cathode couple is inserted into the conductive metal casing such that the casing is connected to the carbonaceous counter electrode grid structure 14 of the current collector 10 according to the present invention, and the lithiated material is contacted to a second current collector, which also preferably has the thicker distal tab portion 38 configuration. In either case, the current collector for the lithiated material or the cathode electrode is in contact with the positive terminal pin via a lead of the same material as the current collector which is welded to both the current collector and the positive terminal pin for electrical contact. In a further embodiment, the cell is built in a case-neutral configuration with both the anode and the cathode connected to respective terminal leads insulated from the casing by glass-to-metal seals.

A preferred material for the casing is titanium although stainless steel, mild steel, nickel-plated mild steel and aluminum are also suitable. The casing header comprises a metallic lid having an opening to accommodate the glass-to-metal seal/terminal pin feedthrough for the cathode electrode. The anode electrode or counter electrode is preferably connected to the case or the lid. An additional opening is provided for electrolyte filling. The casing header comprises elements having compatibility with the other components of the electrochemical cell and is resistant to corrosion. The cell is thereafter filled with the electrolyte solution described hereinabove and hermetically sealed such as by close-welding a stainless steel plug over the fill hole, but not limited thereto. The cell of the present invention can also be constructed in a case-positive design.

It is appreciated that various modifications to the inventive concepts described herein may be apparent to those skilled in the art without departing from the spirit and the scope of the present invention defined by the hereinafter appended claims.

What is claimed is:

1. A current collector for an electrochemical cell, the current collector comprising:
    a) a frame having a frame thickness defined by spaced apart first and second major frame surfaces extending to a frame perimeter;
    b) an interior grid bounded by the frame; and
    c) at least one first tab extending along a tab length from a proximal tab portion connected to the frame perimeter to a distal tab portion, wherein the first tab comprises:
        i) the proximal tab portion having a first thickness defined by spaced apart first and second major proximal tab surfaces aligned perpendicular to the tab length;
        ii) the distal tab portion having a second thickness defined by third and fourth major distal tab surfaces aligned perpendicular to the tab length;
        iii) wherein the first and third major surfaces of the respective proximal and distal tab surfaces are coplanar with the first major surface of the frame, and
        iv) wherein the second thickness of the distal tab portion is greater than the first thickness of the proximal tab portion to thereby form a step from the second major surface of the proximal tab portion to the fourth major surface of the distal tab portion.

2. The current collector of claim 1 wherein the proximal tab portion has a first width defined by fifth and sixth minor proximal tab surfaces meeting the first and second major proximal tab surfaces and wherein a notch extends inwardly into the first width of the proximal tab portion from at least one of the fifth and sixth minor proximal tab surfaces so that a second width of the notch is less than the first width.

3. The current collector of claim 1 wherein the grid comprises first and second major grid surfaces, and wherein the first major grid surface is substantially co-planar with the first major surface of the frame, and wherein the first and third major surfaces of the respective proximal and distal tab surfaces, which are coplanar with the first major surface of the frame, are also coplanar with the first major grid surface of the interior grid.

4. The current collector of claim 1 wherein the interior grid comprises at least two first grid structures extending to spaced apart first and second grid ends joined to the frame at first and second frame locations, and at least two second grid structures extending to spaced apart third and fourth grid ends joined to the frame at third and fourth frame locations, and wherein the at least two first grid structures intersect the at least two second grid structures at locations interior of the frame to thereby form grid openings.

5. The current collector of claim 1 wherein the second thickness of the distal tab portion is about 0.01 to about 2 millimeters.

6. The current collector of claim 1 wherein the grid comprises first and second major grid surfaces, and wherein the first major grid surface is substantially co-planar with the first major surface of the frame.

7. The current collector of claim 6 wherein a thickness of the interior grid between the first and second major grid surfaces is less than the frame thickness.

8. The current collector of claim 1 wherein a length of the distal tab portion is from about 5 percent to about 95 percent of the tab length.

9. The current collector of claim 1 wherein the first thickness of the proximal tab portion is about 25 percent to about 75 percent that of the second thickness of the distal tab portion.

10. The current collector of claim 1 wherein the interior grid comprises a plurality of substantially parallel first grid structures extending to and meeting with opposed portions of the frame at first and second frame locations and a plurality of substantially parallel second grid structures extending to and meeting with opposed portions of the frame at third and fourth frame locations, and wherein the first grid structures are aligned at an angle ranging from about 90° to about 15° with respect to the second grid structures.

11. The current collector of claim 1 wherein the frame provides the interior grid having a shape selected from the group consisting of a circle, a triangle, an octagon, and a hexagon.

12. The current collector of claim 1 including a second current collector, comprising:
 a) a second frame having a second frame thickness defined by spaced apart third and fourth major frame surface extending to a second frame perimeter;
 b) a second interior grid bounded by the second frame;
 c) at least one second tab extending along a second tab length from a proximal second tab portion connected to the second frame perimeter to a distal second tab portion, wherein the second tab comprises:
  i) the proximal second tab portion having a third thickness defined by spaced apart seventh and eighth major proximal tab surfaces aligned perpendicular to the second tab length;
  ii) the distal second tab portion having a fourth thickness defined by ninth and tenth major distal tab surfaces aligned perpendicular to the second tab length;
  iii) wherein the seventh and ninth major surfaces of the respective proximal and distal second tab surfaces are coplanar with the third major surface of the frame, and
  iv) wherein the fourth thickness of the distal second tab portion is greater than the third thickness of the proximal second tab portion to thereby form a step from the eighth major surface of the proximal second tab portion to the tenth major surface of the distal second tab portion; and
 d) a tab junction joining the first tab to the second tab so that the first and second current collectors are opposed to each other.

13. The current collector of claim 12 wherein the proximal second tab portion has a third width defined by eleventh and twelfth minor proximal tab surfaces meeting the seventh and eighth major proximal tab surfaces and wherein a second notch extends inwardly into the third width of the proximal second tab portion from at least one of the eleventh and twelfth minor proximal tab surfaces so that a fourth width of the second notch is less than the third width.

14. An electrochemical cell, comprising:
 a) a casing;
 b) a first electrode comprising a first electrode active material supported on a first current collector;
 c) a second, counter electrode comprising a second electrode active material supported on a second current collector;
 d) a separator disposed between the first and second electrodes to thereby form an electrode assembly housed inside the casing, wherein the separator prevents direct physical contact between the electrodes while providing for ionic conductivity through the separator;
 e) wherein at least one of the first and second current collectors comprises:
  i) a frame having a frame thickness defined by spaced apart first and second major frame surfaces extending to a frame perimeter;
  ii) an interior grid bounded by the frame; and
  iii) at least one tab extending along a tab length from a proximal tab portion connected to the frame perimeter to a distal tab portion, wherein the tab comprises:
   A) the proximal tab portion having a first thickness defined by spaced apart first and second major proximal tab surfaces aligned perpendicular to the tab length;
   B) the distal tab portion having a second thickness defined by third and fourth major distal tab surfaces aligned perpendicular to the tab length;
   C) wherein the first and third major surfaces of the respective proximal and distal tab surfaces are coplanar with the first major surface of the frame, and
   D) wherein the second thickness of the distal tab portion is greater than the first thickness of the proximal tab portion to thereby form a step from the second major surface of the proximal tab portion to the fourth major surface of the distal tab portion; and
 f) an electrolyte residing within the casing activating the first and second electrodes.

15. The electrochemical cell of claim 14 wherein the proximal tab portion has a first width defined by fifth and sixth minor proximal tab surfaces meeting the first and second major proximal tab surfaces and wherein a notch extends inwardly into the first width of the proximal tab portion from at least one of the fifth and sixth minor proximal tab surfaces so that a second width of the notch is less than the first width.

16. The electrochemical cell of claim 14 wherein the first thickness of the proximal tab portion is about 25 percent to about 75 percent that of the second thickness of the distal tab portion.

17. The electrochemical cell of claim 14 wherein the electrolyte includes a first solvent and a second solvent, and wherein the first solvent is selected from the group consisting of tetrahydrofuran, methyl acetate, diglyme, triglyme, tetraglyme, 1,2-dimethoxyethane, diisopropylether, 1,2-diethoxyethane, 1-ethoxy, 2-methoxyethane, dimethyl carbonate, diethyl carbonate, dipropyl carbonate, ethyl methyl carbonate, methyl propyl carbonate and ethyl propyl carbonate, and mixtures thereof, and the second solvent is selected from the group consisting of propylene carbonate, ethylene carbonate, butylene carbonate, acetonitrile, dimethyl sulfoxide, dimethyl formamide, dimethyl acetamide, γ-valerolactone, γ-butyrolactone and N-methyl-pyrrolidinone, and mixtures thereof, and wherein the electrolyte includes an alkali metal salt selected from the group consisting of $LiPF_6$, $LiBF_4$, $LiAsF_6$, $LiSbF_6$, $LiClO_4$, $LiAlCl_4$, $LiGaCl_4$, $LiC(SO_2CF_3)_3$, $LiO_2$, $LiN(SO_2CF_3)_2$, $LiSCN$, $LiO_3SCF_2CF_3$, $LiC_6F_5SO_3$, $LiO_2CCF_3$, $LiSO_3F$, $LiB(C_6H_5)_4$ and $LiCF_3SO_3$, and mixtures thereof.

18. The electrochemical cell of claim 14 wherein the first electrode is an anode and the first electrode active material is comprised of lithium or a lithium-aluminum alloy, and wherein the second electrode is a cathode and the second electrode active material is selected from the group consisting of silver vanadium oxide, copper silver vanadium oxide, copper vanadium oxide, vanadium oxide, manganese dioxide, titanium disulfide, copper oxide, copper sulfide, iron sulfide, iron disulfide, cobalt oxide, nickel oxide, graphite, carbon, fluorinated carbon, and mixtures thereof.

19. The electrochemical cell of claim 14 wherein the at least one of the first and second current collectors is selected from the group consisting of titanium, molybdenum, tantalum, niobium, cobalt, nickel, stainless steel, tungsten, platinum, palladium, gold, silver, copper, chromium, vanadium, aluminum, zirconium, hafnium, zinc, iron, and mixtures and alloys thereof.

20. The electrochemical cell of claim 14 being of either a primary or a secondary chemistry.

* * * * *